US012785943B2

(12) United States Patent
Rush et al.

(10) Patent No.: US 12,785,943 B2
(45) Date of Patent: Nov. 3, 2026

(54) ZERO-TRUST SOFTWARE-BASED SECURITY MODEL

(71) Applicant: Ideem, Inc., Kansas City, KS (US)

(72) Inventors: Toby Rush, Roeland Park, KS (US); Samuel Gordon, Washington, DC (US); Mitchell Joseph Roberts, Stilwell, KS (US); Peter Todd Decker, Kansas City, KS (US); Brian C Koziel, Fate, TX (US); Joel David Teply, Kansas City, KS (US); Craig Gentry, New York, NY (US); Riddhiman Das, Parkville, MO (US); Timoth B Massey, Lake Lotawana, MO (US)

(73) Assignee: Ideem Inc., Leawood, KS (US)

( * ) Notice: Subject to any disclaimer, the term of this patent is extended or adjusted under 35 U.S.C. 154(b) by 72 days.

(21) Appl. No.: 19/081,902

(22) Filed: Mar. 17, 2025

(65) Prior Publication Data

US 2025/0343678 A1 Nov. 6, 2025

Related U.S. Application Data

(60) Provisional application No. 63/642,419, filed on May 3, 2024.

(51) Int. Cl.
*H04L 9/08* (2006.01)
*H04L 9/30* (2006.01)
*H04L 9/32* (2006.01)

(52) U.S. Cl.
CPC .......... *H04L 9/0833* (2013.01); *H04L 9/0891* (2013.01); *H04L 9/0894* (2013.01);
(Continued)

(58) Field of Classification Search
CPC ... H04L 9/0833; H04L 9/0891; H04L 9/0894; H04L 9/3073; H04L 9/321; H04L 9/3271; H04L 9/085; H04L 9/3247
(Continued)

(56) References Cited

U.S. PATENT DOCUMENTS 8,694,784 B1 * 4/2014 Lekies .................. H04L 9/3226 713/169
9,654,469 B1 * 5/2017 Yang ........................ H04L 67/02
(Continued)

OTHER PUBLICATIONS

Anati, I., Gueron, S., Johnson, S., & Scarlata, V. (Jun. 2013). Innovative technology for CPU based attestation and sealing. In Proceedings of the 2nd international workshop on hardware and architectural support for security and privacy (vol. 13, No. 7). (Year: 2013).*
(Continued)

*Primary Examiner* — Philip J Chea
*Assistant Examiner* — Dorianne Alvarado David
(74) *Attorney, Agent, or Firm* — PatentPC PowerPatent; Bao Tran

(57) ABSTRACT

Systems and methods are disclosed for computer attestation by generating, in a software enclave on a native application or browser and from a host device, a key generation request to a secure key client to generate a key pair; performing a multi-party key generation operation between the secure key client on the native application or browser and a secure key server; and storing a first private key share and public key on the secure key client, wherein a second private key share and a public key are stored on the secure key server and wherein the public key is sent from the secure key server to a host server for storage.

19 Claims, 6 Drawing Sheets

(52) U.S. Cl.
CPC ............ *H04L 9/3073* (2013.01); *H04L 9/321* (2013.01); *H04L 9/3271* (2013.01); *H04L 9/085* (2013.01); *H04L 9/3247* (2013.01)

(58) Field of Classification Search
USPC ........................................................... 713/155
See application file for complete search history.

(56) References Cited

U.S. PATENT DOCUMENTS

| | | | | |
|---|---|---|---|---|
| 10,762,197 | B1 * | 9/2020 | Yu | H04L 9/50 |
| 11,165,565 | B2 * | 11/2021 | Belenko | H04L 9/083 |
| 2019/0034617 | A1 * | 1/2019 | Scarlata | G06F 9/30007 |
| 2020/0044863 | A1 * | 2/2020 | Yadlin | G06F 21/44 |
| 2020/0074450 | A1 * | 3/2020 | Fletcher | G06F 21/64 |
| 2021/0160293 | A1 * | 5/2021 | Sinha | H04L 9/0825 |
| 2021/0406404 | A1 * | 12/2021 | Moran | H04L 9/3236 |
| 2022/0158980 | A1 * | 5/2022 | Jain | G06F 9/45558 |
| 2022/0303137 | A1 * | 9/2022 | Brogle | G06F 21/606 |
| 2022/0385470 | A1 * | 12/2022 | Miller | G06F 21/6218 |
| 2023/0004637 | A1 * | 1/2023 | Wang | G06F 21/53 |
| 2023/0008003 | A1 * | 1/2023 | Damiano | H04L 9/0891 |
| 2023/0049860 | A1 * | 2/2023 | Poorebrahim Gilkalaye | G06N 3/0464 |
| 2023/0101347 | A1 * | 3/2023 | Byington | G06F 21/36 726/17 |
| 2023/0177171 | A1 * | 6/2023 | Kushtagi | G06F 21/602 713/155 |
| 2023/0229752 | A1 * | 7/2023 | Brooks | H04L 63/0823 726/10 |
| 2023/0269093 | A1 * | 8/2023 | Ben-Ari | H04L 9/0897 713/175 |
| 2024/0078343 | A1 * | 3/2024 | Sibert | H04L 9/3234 |
| 2024/0283664 | A1 * | 8/2024 | Islam | H04L 9/3271 |
| 2024/0291815 | A1 * | 8/2024 | Pascual | H04L 63/0435 |
| 2024/0372731 | A1 * | 11/2024 | Kobel | H04L 9/008 |
| 2025/0061444 | A1 * | 2/2025 | Komandur | G06Q 20/3829 |
| 2025/0080349 | A1 * | 3/2025 | Wang | G06F 21/6245 |
| 2025/0106040 | A1 * | 3/2025 | Quinlan | H04L 9/3247 |
| 2025/0119273 | A1 * | 4/2025 | Choukroun | G06F 9/547 |
| 2025/0125965 | A1 * | 4/2025 | Galal | H04L 9/3226 |
| 2025/0173711 | A1 * | 5/2025 | Siegel | H04L 9/3247 |
| 2025/0317285 | A1 * | 10/2025 | Islam | H04L 9/3247 |
| 2026/0095315 | A1 * | 4/2026 | Tan | G06Q 20/3825 |

OTHER PUBLICATIONS

Nelson-White, M. (Jul. 12, 2023). Implementing Apple's Device Check App Attest Protocol. https://web.archive.org/web/20240407151621/https://dev.to/mnelsonwhite/implementing-apples-device-check-app-attest-protocol-4p2g (Year: 2023).*

Niemi, A., Nayani, V., Moustafa, M., & Ekberg, J. E. (May 2023). Platform attestation in consumer devices. In 2023 33rd Conference of Open Innovations Association (FRUCT) (pp. 198-209). IEEE. (Year: 2023).*

Pires, R., Pasin, M., Felber, P., & Fetzer, C. (Nov. 2016). Secure content-based routing using intel software guard extensions . In Proceedings of the 17th international middleware conference (pp. 1-10). (Year: 2016).*

Wang, X., Du, Y., Wang, C., Wang, Q., & Fang, L. (2021). Webenclave: Protect web secrets from browser extensions with software enclave. IEEE Transactions on Dependable and Secure Computing, 19(5), 3055-3070. (Year: 2021).*

Zhao, S., Zhang, Q., Qin, Y., Feng, W., & Feng, D. (Nov. 2019). Sectee: A software-based approach to secure enclave architecture using tee. In Proceedings of the 2019 ACM SIGSAC Conference on Computer and Communications Security (pp. 1723-1740). (Year: 2019).*

* cited by examiner

ZERO-TRUST SOFTWARE-BASED SECURITY MODEL

BACKGROUND OF THE INVENTION

The present disclosure generally relates to multifactor authentication and more specification to a zero-trust security module (ZSM) that is a software-defined secure element built on multiparty computation (MPC).

The tradeoff between usability and security is as old as the concept of security itself. When it comes to authenticating users and users' actions, multi-factor authentication (MFA) is an accepted necessity. Broadly, he three categories of authentication factors are: Something you know (your password); Something you have (a piece of hardware); Something you are (your biometrics).

As weak and frustrating as they are, usernames and passwords are still the dominant primary factor for authentication. Thus, the industry has pushed for having two of the three factors present wherever possible. Unfortunately, MFA is at odds with usability. There is an intersection of usability and security where improvement is needed.

Passkeys are gaining traction and will be a pillar of MFA going forward. However, they require modern operating systems, and some amount of user sophistication for setup. They also interrupt user flow every time the passkeys are used. Additionally, by design, they are transferable between user's devices, giving less insight to the application owner into where and how users are engaging with their accounts.

Much more common than passkeys are one-time passwords (OTPs) usually delivered by SMS or WhatsApp. These are costly, requiring payment to phone carriers by both parties with each authentication. They are also a nuisance to the end user, requiring that they recover the password from their messaging application before continuing in their browser. Finally, their security is weak at best, as OTPs are easily phished through social engineering or man-in-the-middle attacks.

Additionally, authentication should not end once the server has verified the user's identity. In many applications, user actions after authentication need to be recorded and verifiably attributed to the authenticated user. This is especially true with financial applications where responsibilities for transactions can come under dispute.

Recent advancements and practical implementations in modern cryptographic techniques like secure multi-party computation (MPC) provide strong solutions to the problem of user authentication, and transaction attribution, by facilitating the production of cryptographic signatures and data encryption without ever storing the cryptographic keys on a single device.

Historically, browsers are the least trusted application environment. They are sand boxed away from operating system (OS) and hardware resources like trusted execution environments or secure enclaves. They are inherently transient and struggle with maintaining state. Asking for MFA in a browser setting exacerbates the user experience while failing to provide strong security.

SUMMARY OF THE INVENTION

In a first aspect, a processor-implemented method of attestation includes generating, in a software enclave on a native application or browser and from a host device, a key generation request to a secure key client to generate a key pair; performing a multi-party key generation operation between the secure key client on the native application or browser and a secure key server; and storing a first private key share and public key on the secure key client, wherein a second private key share and a public key are stored on the secure key server and wherein the public key is sent from the secure key server to a host server for storage.

In a second aspect, an apparatus for performing attestation, the apparatus comprising: at least one memory; and at least one processor coupled to at least one memory and configured to: generate, in a software enclave on a native application or browser and from a host device, a key generation request to a secure key client to generate a key pair; perform a multi-party key generation operation between the secure key client on the native application or browser and a secure key server; and store a first private key share and public key on the secure key client, wherein a second private key share and a public key are stored on the secure key server and wherein the public key is sent from the secure key server to a host server for storage.

In a third aspect, a non-transitory computer-readable medium having stored thereon instructions that, when executed by one or more processors, cause the one or more processors to be configured to: generate, in a software enclave on a native application or browser and from a host device, a key generation request to a secure key client to generate a key pair; perform a multi-party key generation operation between the secure key client on the native application or browser and a secure key server; and store a first private key share and public key on the secure key client, wherein a second private key share and a public key are stored on the secure key server and wherein the public key is sent from the secure key server to a host server for storage.

In a fourth aspect, an apparatus for performing attestation, the apparatus including one or more: means for generating, in a software enclave on a native application or browser and from a host device, a key generation request to a secure key client to generate a key pair; means for performing a multi-party key generation operation between the secure key client on the native application or browser and a secure key server; and means for storing a first private key share and public key on the secure key client, wherein a second private key share and a public key are stored on the secure key server and wherein the public key is sent from the secure key server to a host server for storage.

In a fifth aspect, a processor-implemented method of assertion includes transmitting, from a software enclave on a native application or browser and from a host device, a challenge request to a host server; receiving, at the host device, a challenge from the host server; transmitting the challenge from the host device to a secure key client in the software enclave; transmitting the challenge from the secure key client in the software enclave to a secure key server; performing a multi-party key generation operation between the secure key client on the native application or browser and the secure key server to generate a signed challenge; and transmitting the signed challenge to the host server to verify a signature with a stored public key on the host server.

In a sixth aspect, an apparatus for performing assertion, the apparatus comprising: at least one memory; and at least one processor coupled to at least one memory and configured to: transmit, from a software enclave on a native application or browser and from a host device, a challenge request to a host server; receive, at the host device, a challenge from the host server; transmit the challenge from the host device to a secure key client in the software enclave; transmit the challenge from the secure key client in the software enclave to a secure key server; perform a multiparty key generation operation between the secure key client on the native application or browser and the secure key server to generate a signed challenge; and transmit the signed challenge to the host server to verify a signature with a stored public key on the host server.

In a seventh aspect, a non-transitory computer-readable medium having stored thereon instructions that, when executed by one or more processors, cause the one or more processors to be configured to: transmit, from a software enclave on a native application or browser and from a host device, a challenge request to a host server; receive, at the host device, a challenge from the host server; transmit the challenge from the host device to a secure key client in the software enclave; transmit the challenge from the secure key client in the software enclave to a secure key server; perform a multi-party key generation operation between the secure key client on the native application or browser and the secure key server to generate a signed challenge; and transmit the signed challenge to the host server to verify a signature with a stored public key on the host server.

In an eighth aspect, an apparatus for performing an assertion, the apparatus including one or more: means for transmitting, from a software enclave on a native application or browser and from a host device, a challenge request to a host server; means for receiving, at the host device, a challenge from the host server; means for transmit the challenge from the host device to a secure key client in the software enclave; means for transmitting the challenge from the secure key client in the software enclave to a secure key server; means for performing a multi-party key generation operation between the secure key client on the native application or browser and the secure key server to generate a signed challenge; and means for transmitting the signed challenge to the host server to verify a signature with a stored public key on the host server.

The disclosed ZSM (zero-trust security module) is a software-defined secure element built on multiparty computation (MPC). The ZSM can be bound to a device via a native application, mobile browser, or desktop browser. The combination of device binding and MPC key signing make it a seamless two-factor authentication (2FA) that delivers usability and security. The operating characteristic that allows it to operate native or browser applications gives it a "universal" characteristic in that it will serve its purpose in nearly any environment.

The ZSM serves as a "possession" factor for 2FA that can sign a challenge sent by a relying party server. No user action is required, and it can be used for traditional use cases like logging in, as well as for transaction signing. The ZSM is a step change in innovation in that it can run in all common modern browsers or applications. It brings a level of security and trust to web applications that unlock a host of sensitive applications like Financial Services, Healthcare, and Enterprise.

The ZSM is securely bound to the device (smartphone, tablet, laptop, Point of Sale, etc.) using local cryptographic libraries like Apple's Secure Enclave, Android's Trusted Execution Environment (TEE), or a browser's Web Crypto API (WCA). This strong and persistent device binding allows native and web apps to trust the device without having to constantly require an action from the user. In one example, where there is a point of sale involved, the ZSM may be securely bound to the mobile device and/or the point of sale device that communications over a wireless link with the mobile device.

Not only is the ZSM bound to a device, but it also establishes remotely verifiable proof that a logon attempt or action made on behalf of a certain user is initiated from the same exact device previously registered to that user. The solution implements sophisticated multi-party computation (MPC) to securely generate cryptographic private key shares between the client device and the secure key server in such a way that the full private keys never exist on either the device or server. The client and server use these shares, yet never exchange them, to perform cryptographic operations like digital signing and key refreshing together.

The innovative capabilities of device binding and key signing will create a seamless user experience, with less cost and stronger security.

In some aspects, the techniques described herein relate to a processor-implemented method of attestation, the processor-implemented method including: generating, in a software enclave on a native application or browser and from a host device, a key generation request to a secure key client to generate a key pair; performing a multi-party key generation operation between the secure key client on the native application or browser and a secure key server; and storing a first private key share and public key on the secure key client, wherein a second private key share and a public key are stored on the secure key server and wherein the public key is sent from the secure key server to a host server for storage.

In some aspects, the techniques described herein relate to an apparatus for performing attestation, the apparatus including: at least one memory; and at least one processor coupled to at least one memory and configured to: generate, in a software enclave on a native application or browser and from a host device, a key generation request to a secure key client to generate a key pair; perform a multi-party key generation operation between the secure key client on the native application or browser and a secure key server; and store a first private key share and public key on the secure key client, wherein a second private key share and a public key are stored on the secure key server and wherein the public key is sent from the secure key server to a host server for storage.

In some aspects, the techniques described herein relate to a non-transitory computer-readable medium having stored thereon instructions that, when executed by one or more processors, cause the one or more processors to be configured to: generate, in a software enclave on a native application or browser and from a host device, a key generation request to a secure key client to generate a key pair; perform a multi-party key generation operation between the secure key client on the native application or browser and a secure key server; and store a first private key share and public key on the secure key client, wherein a second private key share and a public key are stored on the secure key server and wherein the public key is sent from the secure key server to a host server for storage.

In some aspects, the techniques described herein relate to an apparatus for performing attestation, the apparatus including one or more: means for generating, in a software enclave on a native application or browser and from a host device, a key generation request to a secure key client to generate a key pair; means for performing a multi-party key generation operation between the secure key client on the native application or browser and a secure key server; and means for storing a first private key share and public key on the secure key client, wherein a second private key share and a public key are stored on the secure key server and wherein the public key is sent from the secure key server to a host server for storage.

In some aspects, the techniques described herein relate to a processor-implemented method of assertion, the processor-implemented method including: transmitting, from a software enclave on a native application or browser and from a host device, a challenge request to a host server; receiving, at the host device, a challenge from the host server; transmitting the challenge from the host device to a secure key client in the software enclave; transmitting the challenge from the secure key client in the software enclave to a secure key server; performing a multi-party key generation operation between the secure key client on the native application or browser and the secure key server to generate a signed challenge; and transmitting the signed challenge to the host server to verify a signature with a stored public key on the host server.

In some aspects, the techniques described herein relate to an apparatus for performing assertion, the apparatus including: at least one memory; and at least one processor coupled to at least one memory and configured to: transmit, from a software enclave on a native application or browser and from a host device, a challenge request to a host server; receive, at the host device, a challenge from the host server; transmit the challenge from the host device to a secure key client in the software enclave; transmit the challenge from the secure key client in the software enclave to a secure key server; perform a multi-party key generation operation between the secure key client on the native application or browser and the secure key server to generate a signed challenge; and transmit the signed challenge to the host server to verify a signature with a stored public key on the host server.

In some aspects, the techniques described herein relate to a non-transitory computer-readable medium having stored thereon instructions that, when executed by one or more processors, cause the one or more processors to be configured to: transmit, from a software enclave on a native application or browser and from a host device, a challenge request to a host server; receive, at the host device, a challenge from the host server; transmit the challenge from the host device to a secure key client in the software enclave; transmit the challenge from the secure key client in the software enclave to a secure key server; perform a multi-party key generation operation between the secure key client on the native application or browser and the secure key server to generate a signed challenge; and transmit the signed challenge to the host server to verify a signature with a stored public key on the host server.

In some aspects, the techniques described herein relate to an apparatus for performing an assertion, the apparatus including one or more: means for transmitting, from a software enclave on a native application or browser and from a host device, a challenge request to a host server; means for receiving, at the host device, a challenge from the host server; means for transmit the challenge from the host device to a secure key client in the software enclave; means for transmitting the challenge from the secure key client in the software enclave to a secure key server; means for performing a multi-party key generation operation between the secure key client on the native application or browser and the secure key server to generate a signed challenge; and means for transmitting the signed challenge to the host server to verify a signature with a stored public key on the host server.

Advantages of the system may include one or more of the following. The system makes the 2FA (second factor authentication) more efficient. The technology takes advantage of internet connectivity rather than cell phone telephony—therefore operation costs are dramatically cheaper. Typically the system can authenticate a device for ⅓ the price of a One Time Passcode (OTP) (the typical approach at present). The approach is "invisible" to the end user. The application calls our service in the background (rather than sending a message to the OTP service—like Twillio, for instance) without the user doing anything—no code to type, no "opt-in", no user permissions, etc. So, the system enables a superior customer user experience (i.e. no stopping to enter a code). The approach is also substantially more resilient to account takeover fraud attempts. Most importantly, the system components contemplated here aren't "phishable"—there is nothing to "phish". A common account takeover fraud attack on a system protected by OTPs is a "sim swap" attack where a fraudster essentially figures out how to take over a phone number and direct the OTP intended for a user to another phone (i.e. the fraudster steals a login/password via a wifi in a coffee shop, and then does the sim swap). The system contemplated in this patent eliminates this potential fraud vector. Finally, the system contemplated here can be used to create a mathematically provable link between a user, a device and a specific transaction date/time. This linkage can be used for transaction attestation where such attestation is valuable.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF DRAWINGS

This application will become more fully understood from the following detailed description, taken in conjunction with the accompanying figures, wherein like reference numerals refer to like elements in which.

DETAILED DESCRIPTION OF THE INVENTION

Figure 1:
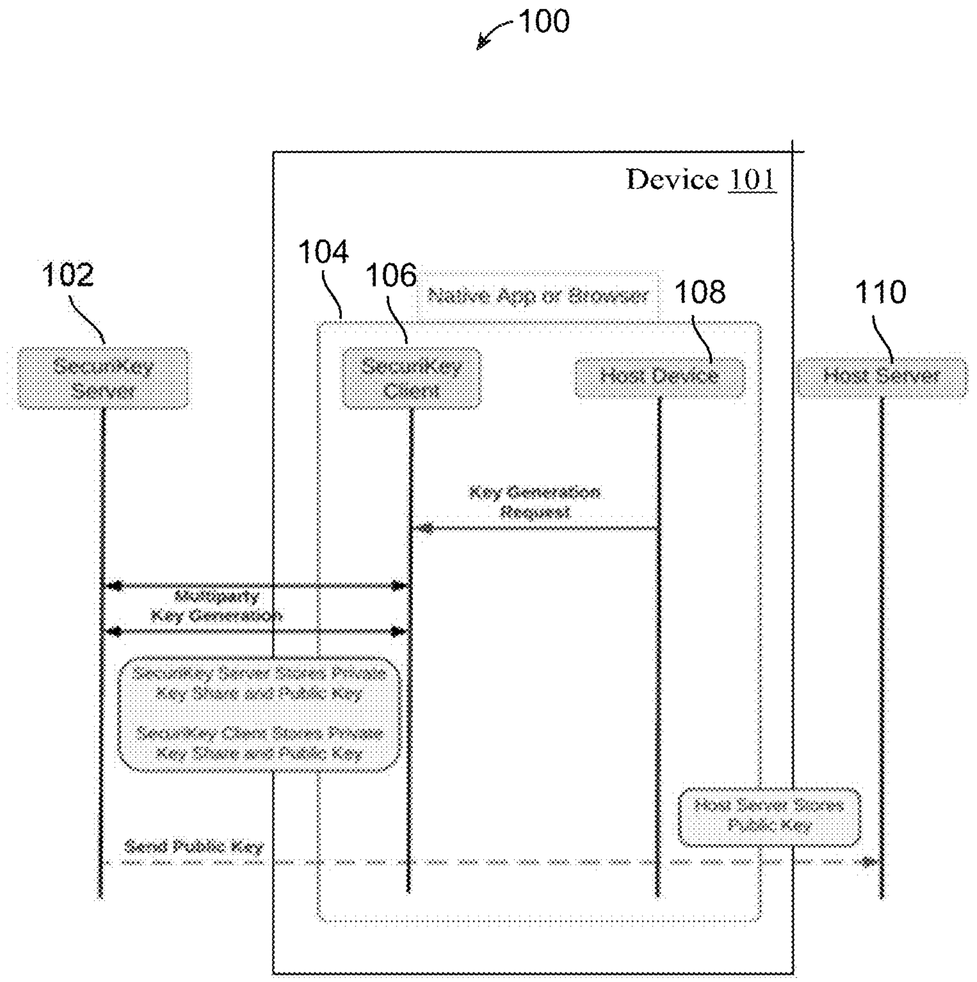
FIG. 1 is a diagram illustrating an attestation process, according to some aspects of this disclosure

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

This invention now will be described more fully hereinafter with reference to the accompanying drawings, in which exemplary embodiments are shown. Various embodiments are now described with reference to the drawings, wherein such as reference numerals are used to refer to such as elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the such as represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

FIG. 1 illustrates a key attestation operation 100. The ZSM system seamlessly provides two factor authentication (2FA) without interaction from the end user. Using threshold MPC, it provides strong cryptographic signatures on each "security event" of the user, including user logins, and any subsequent transactions that can need verification at a later time. The cryptographic primitives are pieced together in the following description to provide the guarantees.

When a client login occurs on a new device for the first time, the client and secure key server 102 engage in a key generation procedure. As a first step, the client 104 must perform a strong authentication using username and password, ideally together with a traditional second factor, such as a OTP or a biometric, if available. The authentication step provides the UserID, which is combined with a DeviceID, as described next.

A host device 108 can transmit a key generation request to the secure key client 106. The client via a secure key client 106 generates a keypair for (standard) digital signatures using the trusted execution environment (TEE) or secure enclave 104 (which can be software based and part of a native application or browser or other software component on a device) if those are available (i.e. when executing in a native app), and using the Web Crypto API (e.g., such as WCA) when they are not (i.e. when executing in a browser). In the latter case, the key is created with an extractable flag set to False. The device specific signing key is used to sign every message throughout the remainder of the protocol; the "device-binding key" binds all interactions to the current device going forward. A hash of the public verification key is used as a device identifier (DeviceID), and sent to the ZSM server or secure key server 102 for storage.

Two other identifiers are combined with the DeviceID and UserID to create a single unique identifying set: ApplicationID, and EnvironmentID. The UserID allows multiple different system users to use the same device, without sharing keys. The ApplicationID allows the customer to support multiple applications, and the EnvironmentID is for special flags such as Development, Testing and Production. The seruce key server transmits a public key to a host server 110.

The client 106 and server 102 run key generation for a threshold signature scheme (ECDSA or RSA). These threshold keys will be used for signing future security events, including login events, as well as any financial transactions executed by the client. Both parties associate their Key Share with the unique identifying set: (DeviceID, UserID, ApplicationID, EnironmentID). The ZSM server or secure key server 102 sends the identifying set, and the public verification key, to the host server 110.

Figure 2:
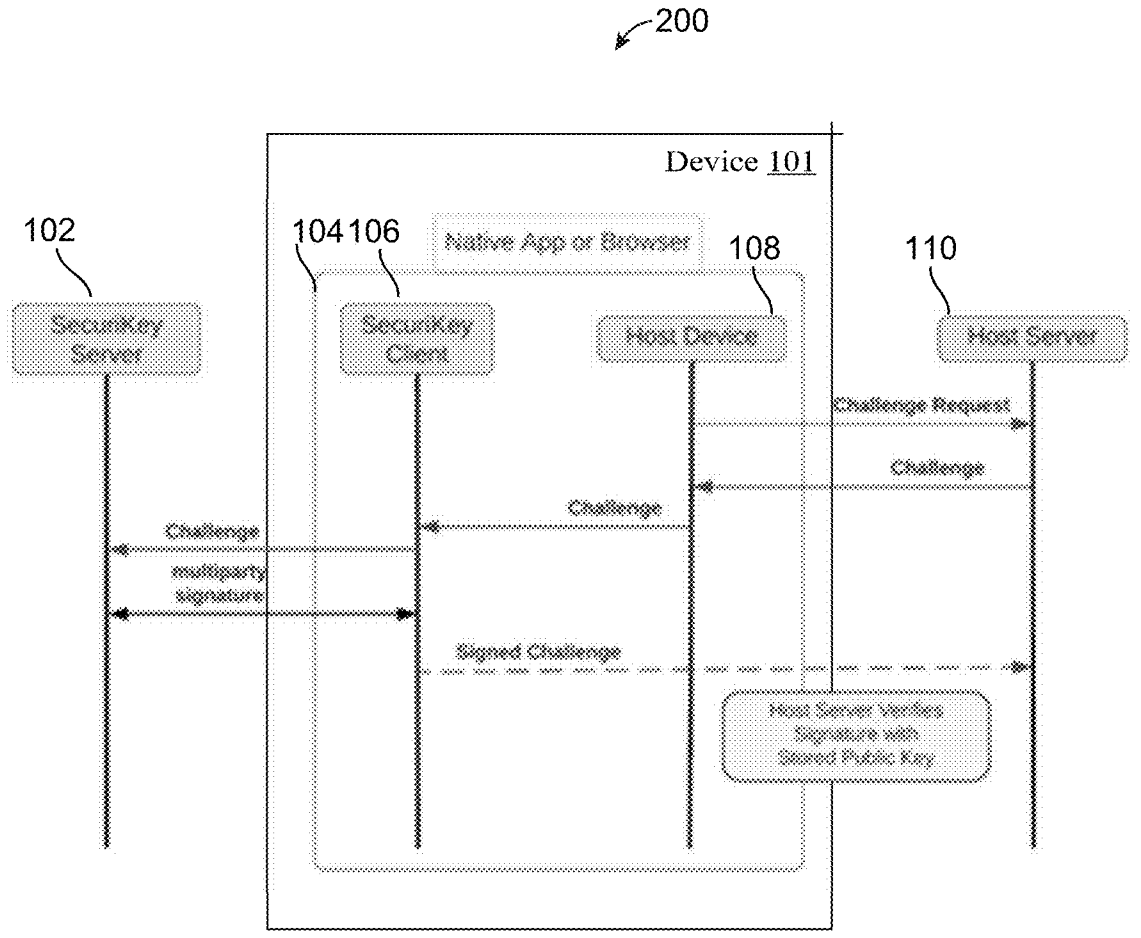
FIG. 2 is a diagram illustrating an assertion process, according to some aspects of this disclosure

FIG. 2 illustrates the assertion operation 200. At each user login, including after client registration, and at each security event, such as a financial transaction or other notable account actions, a threshold digital signature is produced for the event. Every client message of the interactive signing protocol is signed using device-binding key, ensuring that the MPC Key Share used in the threshold signature is being used from the correct device, and has not been cloned.

After the signature is produced, a key refresh procedure is executed in order to proactively refresh the MPC Key Share. This ensures that if an adversary manages to clone the device, but does not attain a persistent foothold on the device, the Key Share will be outdated and unusable for producing new signatures. This provides an additional guarantee, on top of the device-binding key.

The approach applies secure multi-party computation (MPC) cryptography with two parties: a user's device (smartphone, laptop, etc.) and a remote backend administrative server. The MPC architecture enables the client device and secure key server 102 to work together to complete cryptographic operations without exchanging information that could be used to impersonate either party. The private key never exists in any one place. In the assertion process, the host device 108 on the client device sends a challenge request to the host server 110 which response with a challenge message back. The host device 108 sends the challenge message to the secure key client 106 that then sends the challenge to the secure key server 102. The MPC occurs between the secure key server 102 and the secure key client 106 and a signed challenge is transmitted from the secure key client 106 to the host server 110 that verifies the signature with the stored public key.

Figure 3:
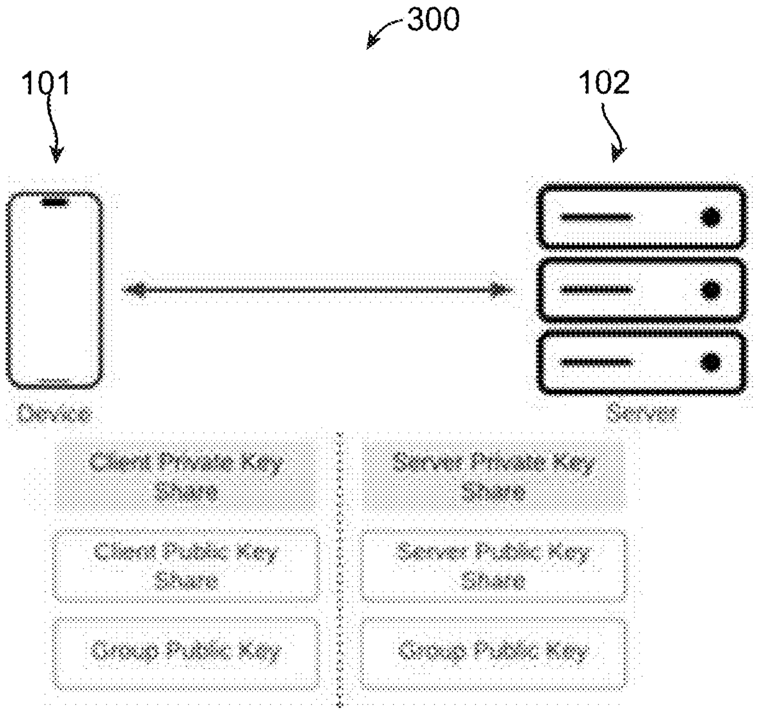
FIG. 3 is a diagram illustrating an example of hardware components used for providing a zero-trust security module, according to aspects of the disclosure

FIG. 3 shows the secure key MPC architecture 300 including the client device 101 and the secure key server 102. Notice how the client device 101 holds the client private key share, the client public key share and the group public key. The secure key server 102 holds the server private key share, the server public key share and the group public key.

Figure 4A:
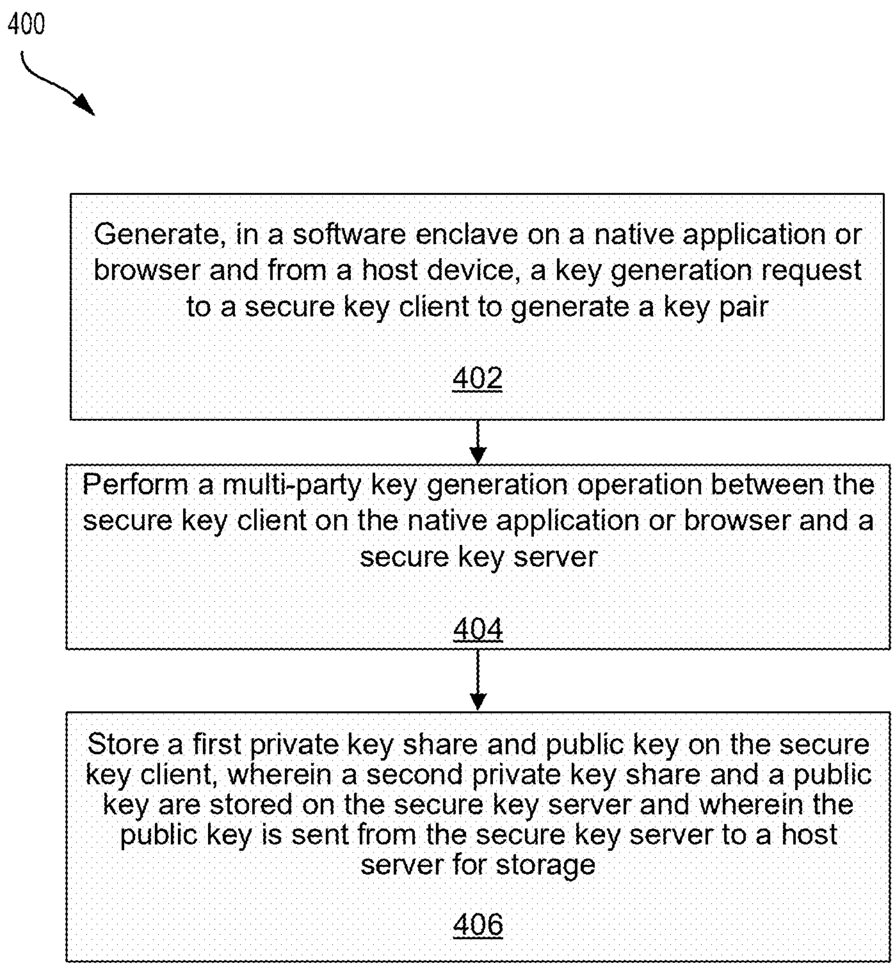
FIG. 4A is a flow diagram illustrating an attestation process, according to aspects of the disclosure

FIG. 4A is a flow diagram illustrating an example of a process 400 for performing attestation. The process 400 is drafted from the standing of a secure enclave of a native application or browser or other software component. While the various modules or aspects are claimed or described in this example from the standpoint of the native application or browser 104 that can include a secure key client 106 and/or a host device 108, the method can also be covered or claimed from the standing of the secure key server 102, the host server 110, a computing system 500, any subcomponent thereof, or any combination of processes that occur on the native application or browser 104, the secure key server 102 and/or the host server 108, as well as the secure key client 106, the computing system 500 and/or the host device 108. In this process, the private keys are used in such a way that the full private keys never exist on either the client device or the server.

At block 402, the process 400 causes a component (i.e., the native application or browser 104, the secure key server 102 and/or the host server 108, as well as the secure key client 106, the computing system 500 and/or the host device 108) to be configure to: generate, in a software enclave on a native application or browser and from a host device, a key generation request to a secure key client to generate a key pair.

At block 404, the process 400 causes a component (i.e., the native application or browser 104, the secure key server 102 and/or the host server 108, as well as the secure key client 106, the computing system 500 and/or the host device 108) to be configure to: perform a multi-party key generation operation between the secure key client on the native application or browser and a secure key server. The secure key client can be on a computer, a mobile device, a point of sale device, an IoT device, a robot, and so forth.

At block 406, the process 400 causes a component (i.e., the native application or browser 104, the secure key server 102 and/or the host server 108, as well as the secure key client 106, the computing system 500 and/or the host device 108) to be configure to: store a first private key share and public key on the secure key client, wherein a second private key share and a public key are stored on the secure key server and wherein the public key is sent from the secure key server to a host server for storage. In this manner, the full private keys never exist on either the client device or the server.

An apparatus for performing attestation can include at least one memory (e.g., a memory configured in circuitry such as one or more of system memory 515, memory 520, 525 and/or cache 511 of FIG. 5) and at least one processor (e.g., processor 512 of FIG. 5) coupled to the at least one memory and configured to: store a first private key share and public key on the secure key client, wherein a second private key share and a public key are stored on the secure key server and wherein the public key is sent from the secure key server to a host server for storage.

In another aspect, an apparatus for performing attestation can include: at least one memory; and at least one processor coupled to at least one memory and configured to: generate, in a software enclave on a native application or browser and from a host device, a key generation request to a secure key client to generate a key pair; perform a multi-party key generation operation between the secure key client on the native application or browser and a secure key server; and store a first private key share and public key on the secure key client, wherein a second private key share and a public key are stored on the secure key server and wherein the public key is sent from the secure key server to a host server for storage.

In another aspect, a non-transitory computer-readable medium can have stored thereon instructions that, when executed by one or more processors, cause the one or more processors to be configured to: generate, in a software enclave on a native application or browser and from a host device, a key generation request to a secure key client to generate a key pair; perform a multi-party key generation operation between the secure key client on the native application or browser and a secure key server; and store a first private key share and public key on the secure key client, wherein a second private key share and a public key are stored on the secure key server and wherein the public key is sent from the secure key server to a host server for storage.

In yet another aspect, an apparatus for performing attestation, the apparatus can include one or more: means for generating, in a software enclave on a native application or browser and from a host device, a key generation request to a secure key client to generate a key pair; means for performing a multi-party key generation operation between the secure key client on the native application or browser and a secure key server; and means for storing a first private key share and public key on the secure key client, wherein a second private key share and a public key are stored on the secure key server and wherein the public key is sent from the secure key server to a host server for storage.

Figure 4B:
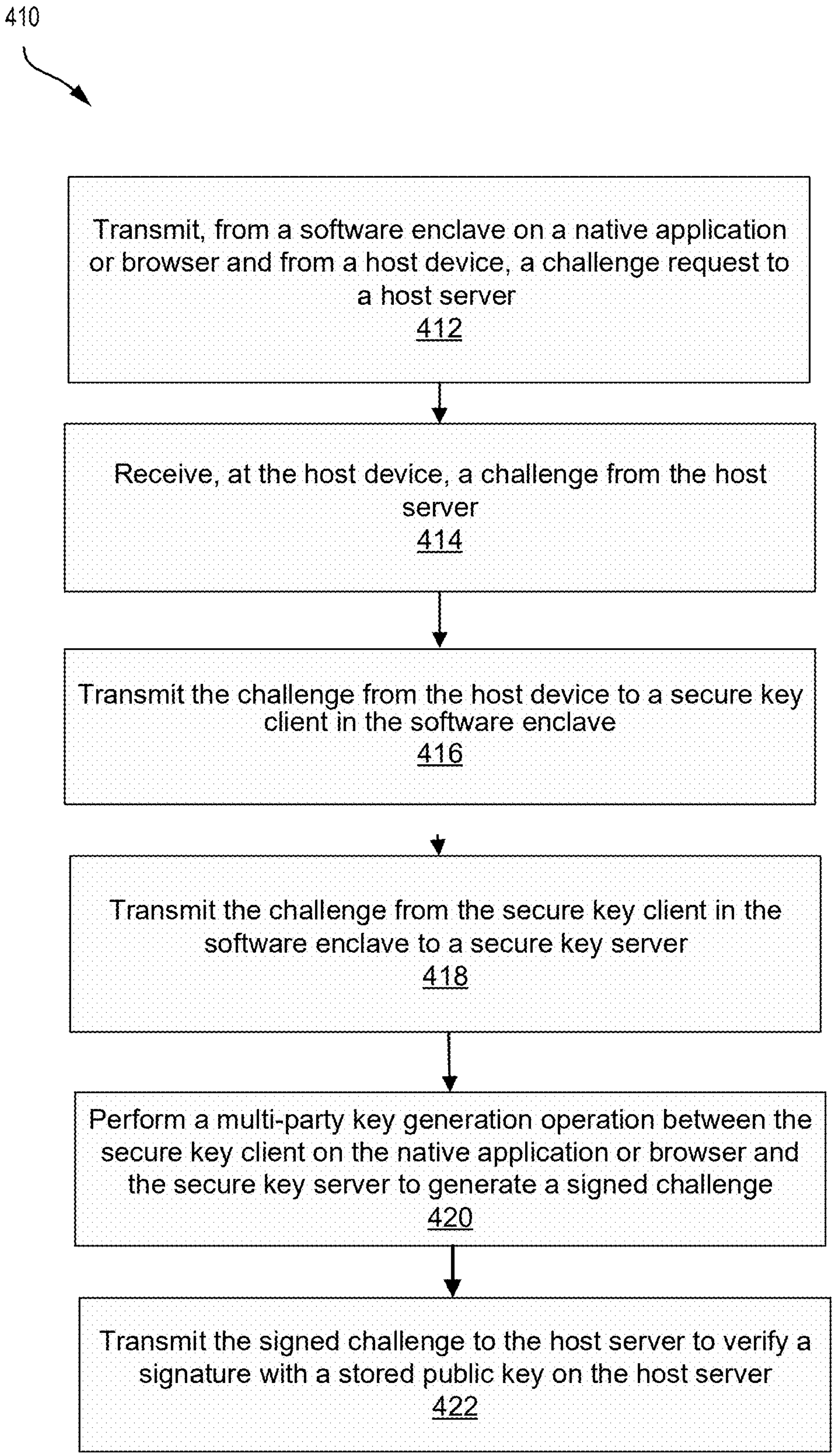
FIG. 4B is a flow diagram illustrating an assertion process, according to aspects of the disclosure.

FIG. 4B illustrates another example process 410 for operating performing assertion. The process 410 is drafted from the standing of a secure enclave of a native application or browser or other software component. While the various modules or aspects are claimed or described in this example from the standpoint of the native application or browser 104 that can include a secure key client 106 and/or a host device 108, the method can also be covered or claimed from the standing of the secure key server 102, the host server 110, a computing system 500, any subcomponent thereof, or any combination of processes that occur on the native application or browser 104, the secure key server 102 and/or the host server 108, as well as the secure key client 106, the computing system 500 and/or the host device 108.

At block 412, the process 400 causes a component (i.e., the native application or browser 104, the secure key server 102 and/or the host server 108, as well as the secure key client 106, the computing system 500 and/or the host device 108) to be configure to: transmit, from a software enclave on a native application or browser and from a host device, a challenge request to a host server.

At block 414, the process 400 causes a component (i.e., the native application or browser 104, the secure key server 102 and/or the host server 108, as well as the secure key client 106, the computing system 500 and/or the host device 108) to be configure to: receive, at the host device, a challenge from the host server.

At block 416, the process 400 causes a component (i.e., the native application or browser 104, the secure key server 102 and/or the host server 108, as well as the secure key client 106, the computing system 500 and/or the host device 108) to be configure to: transmit the challenge from the host device to a secure key client in the software enclave.

At block 418, the process 400 causes a component (i.e., the native application or browser 104, the secure key server 102 and/or the host server 108, as well as the secure key client 106, the computing system 500 and/or the host device 108) to be configure to: transmit the challenge from the secure key client in the software enclave to a secure key server.

At block 420, the process 400 causes a component (i.e., the native application or browser 104, the secure key server 102 and/or the host server 108, as well as the secure key client 106, the computing system 500 and/or the host device 108) to be configure to: perform a multi-party key generation operation between the secure key client on the native application or browser and the secure key server to generate a signed challenge.

At block 422, the process 400 causes a component (i.e., the native application or browser 104, the secure key server 102 and/or the host server 108, as well as the secure key client 106, the computing system 500 and/or the host device 108) to be configure to: transmit the signed challenge to the host server to verify a signature with a stored public key on the host server.

In some aspects, an apparatus for performing assertion can include: at least one memory; and at least one processor coupled to at least one memory and configured to: transmit, from a software enclave on a native application or browser and from a host device, a challenge request to a host server; receive, at the host device, a challenge from the host server; transmit the challenge from the host device to a secure key client in the software enclave; transmit the challenge from the secure key client in the software enclave to a secure key server; perform a multi-party key generation operation between the secure key client on the native application or browser and the secure key server to generate a signed challenge; and transmit the signed challenge to the host server to verify a signature with a stored public key on the host server.

In some aspects, a non-transitory computer-readable medium can have stored thereon instructions that, when executed by one or more processors, cause the one or more processors to be configured to: transmit, from a software enclave on a native application or browser and from a host device, a challenge request to a host server; receive, at the host device, a challenge from the host server; transmit the challenge from the host device to a secure key client in the software enclave; transmit the challenge from the secure key client in the software enclave to a secure key server; perform a multi-party key generation operation between the secure key client on the native application or browser and the secure key server to generate a signed challenge; and transmit the signed challenge to the host server to verify a signature with a stored public key on the host server.

In some aspects, an apparatus for performing an assertion can include one or more: means for transmitting, from a software enclave on a native application or browser and from a host device, a challenge request to a host server; means for receiving, at the host device, a challenge from the host server; means for transmit the challenge from the host device to a secure key client in the software enclave; means for transmitting the challenge from the secure key client in the software enclave to a secure key server; means for performing a multi-party key generation operation between the secure key client on the native application or browser and the secure key server to generate a signed challenge; and means for transmitting the signed challenge to the host server to verify a signature with a stored public key on the host server.

In some examples, the processes described herein (e.g., processes 400/410 and/or any other process described herein) may be performed by a computing device, apparatus, or system. In some examples, the processes 400/410 can be performed by the computing system 500 of FIG. 5. The computing device, apparatus, or system can include any suitable device, such as a mobile device (e.g., a mobile phone), a desktop computing device, a tablet computing device, a wearable device, a server computer, an autonomous vehicle or computing device of an autonomous vehicle, a robotic device, a laptop computer, a smart television, a camera, and/or any other computing device with the resource capabilities to perform the processes described herein, including the processes 400/410 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 400/410 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 400/410 and/or any other process described herein can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a computer-readable or machine-readable storage medium, for example, in the form of a computer program including a plurality of instructions executable by one or more processors. The computer-readable or machine-readable storage medium can be non-transitory.

Figure 5:
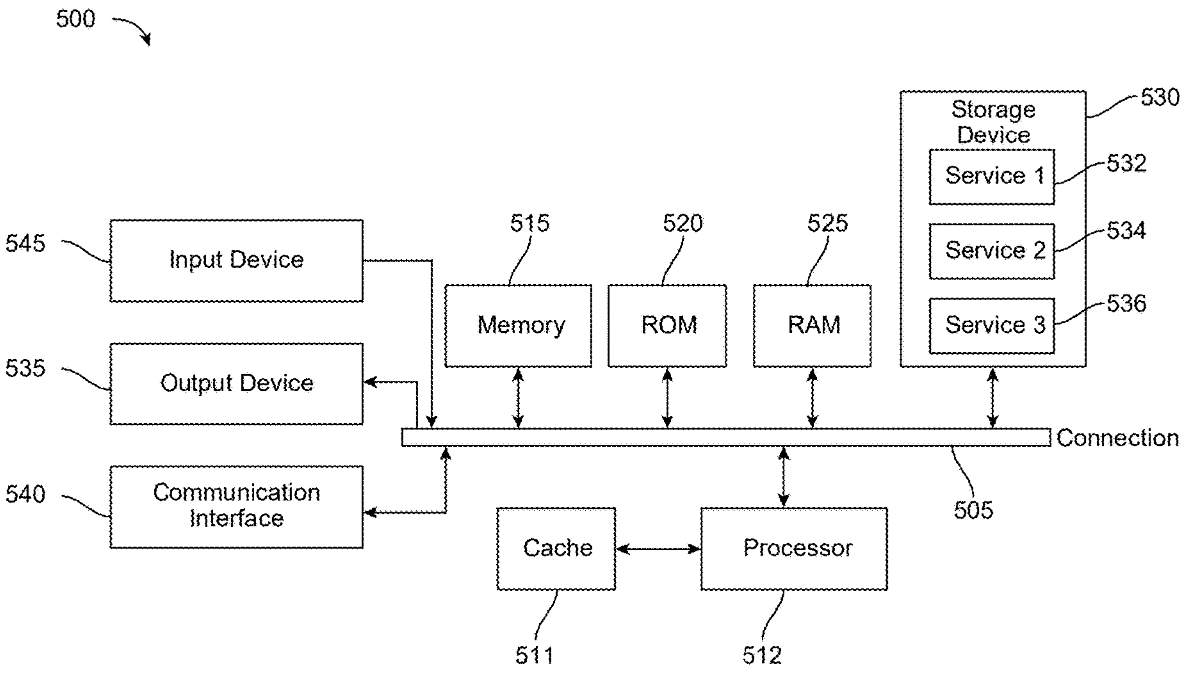
FIG. 5 is a diagram illustrating an example of a computing system, according to aspects of the disclosure.

FIG. 5 is a diagram illustrating an example of a system for implementing certain aspects of the present technology. In particular, FIG. 5 illustrates an example of computing system 500, which can be for example any computing device making up internal computing system, a remote computing system, a camera, or any component thereof in which the components of the system are in communication with each other using connection 505. Connection 505 can be a physical connection using a bus, or a direct connection into processor 510, such as in a chipset architecture. Connection 505 can also be a virtual connection, networked connection, or logical connection.

In some aspects, computing system 500 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example computing system 500 includes at least one processing unit (CPU or processor) which can be characterizes as a processor 510 and connection 505 that couples various system components including system memory 515, such as read-only memory (ROM) memory 520 and random-access memory (RAM) memory 525 to processor 510. Computing system 500 can include a cache 511 of memory connected directly with, in close proximity to, or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 can essentially be a completely self-contained computing system, containing multiple cores or processors, a bus, memory controller, cache, etc. A multi-core processor can be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms. In some instances, multimodal systems can enable a user to provide multiple types of input/output to communicate with computing system 500. Computing system 500 can include communications interface 540, which can generally govern and manage the user input and system output.

The communication interface can perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, WLAN signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/long term evolution (LTE) cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 540 can also include one or more GNSS receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here can easily be substituted for hardware or firmware arrangements as they are developed.

Storage device 530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a Europay, Mastercard and Visa (EMV) chip, a subscriber identity module (SIM) card, a mini/micro/nano/pico SIM card, another integrated circuit (IC) chip/card, RAM, static RAM (SRAM), dynamic RAM (DRAM), ROM, programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 530 can include software services, servers, services, etc., that when the code that defines such software is executed by the processor 510, it causes the system to perform a function. In some aspects, a hardware service that performs a particular function can include the software component stored in a computer-readable medium in connection with the necessary hardware components, such as processor 510, connection 505, output device 535, etc., to carry out the function. The term "computer-readable medium" includes, but is not limited to, portable or non-portable storage devices, optical storage devices, and various other mediums capable of storing, containing, or carrying instruction(s) and/or data. A computer-readable medium can include a non-transitory medium in which data can be stored and that does not include carrier waves and/or transitory electronic signals propagating wirelessly or over wired connections.

The term "computer-readable medium" includes, but is not limited to, portable or non-portable storage devices, optical storage devices, and various other mediums capable of storing, containing, or carrying instruction(s) and/or data. A computer-readable medium can include a non-transitory medium in which data can be stored and that does not include carrier waves and/or transitory electronic signals propagating wirelessly or over wired connections. Examples of a non-transitory medium can include, but are not limited to, a magnetic disk or tape, optical storage media such as compact disk (CD) or digital versatile disk (DVD), flash memory, memory or memory devices. A computer-readable medium can have stored thereon code and/or machine-executable instructions that can represent a procedure, a function, a subprogram, a program, a routine, a subroutine, a module, an engine, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted via any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects can be practiced without these specific details. For clarity of explanation, in some instances the present technology can be presented as including individual functional blocks including devices, device components, steps or routines in a method embodied in software, or combinations of hardware and software. Additional components can be used other than those shown in the figures and/or described herein. For example, circuits, systems, networks, processes, and other components can be shown as components in block diagram form in order not to obscure the aspects in unnecessary detail. In other instances, well-known circuits, processes, algorithms, structures, and techniques can be shown without unnecessary detail in order to avoid obscuring the aspects.

Individual aspects can be described above as a process or method which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in a figure. A process can correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions can be, for example, binaries, intermediate format instructions such as assembly language, firmware, source code. Examples of computer-readable media that can be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) can be stored in a computer-readable or machine-readable medium. A processor(s) can perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts can be otherwise variously embodied and employed, and that the appended claims are intended to be construed to include such variations, except as limited by the prior art. Various features and aspects of the above-described application can be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods can be performed in a different order than that described. One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Claim language or other language reciting "at least one processor configured to," "at least one processor being configured to," "a processor configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor canonly perform at least a subset of operations X, Y, and Z.

The various illustrative logical blocks, modules, engines, circuits, and algorithm steps described in connection with the examples disclosed herein can be implemented as electronic hardware, computer software, firmware, or combinations thereof. To illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present application.

The techniques described herein can also be implemented in electronic hardware, computer software, firmware, or any combination thereof. Such techniques can be implemented in any of a variety of devices such as general purposes computers, wireless communication device handsets, or integrated circuit devices having multiple uses including application in wireless communication device handsets and other devices. Any features described as modules, engines, or components can be implemented together in an integrated logic device or separately as discrete but interoperable logic devices. If implemented in software, then the techniques can be realized at least in part by a computer-readable data storage medium including program code including instructions that, when executed, performs one or more of the methods, algorithms, and/or operations described above. The computer-readable data storage medium can form part of a computer program product, which can include packaging materials. The computer-readable medium can include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, can be realized at least in part by a computer-readable communication medium that carries or communicates program code in the form of instructions or data structures and that can be accessed, read, and/or executed by a computer, such as propagated signals or waves.

The program code can be executed by a processor, which can include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor can be configured to perform any of the techniques described in this disclosure. A general-purpose processor can be a microprocessor; but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein can refer to any of the foregoing structure, any combination of the foregoing structure, or any other structure or apparatus suitable for implementation of the techniques described herein.

Illustrative clauses of the disclosure include:

Clause 1. A processor-implemented method of attestation, the processor-implemented method comprising: generating, in a software enclave on a native application or browser and from a host device, a key generation request to a secure key client to generate a key pair; performing a multi-party key generation operation between the secure key client on the native application or browser and a secure key server; and storing a first private key share and public key on the secure key client, wherein a second private key share and a public key are stored on the secure key server and wherein the public key is sent from the secure key server to a host server for storage.

Clause 2. An apparatus for performing attestation, the apparatus comprising: at least one memory; and at least one processor coupled to at least one memory and configured to: generate, in a software enclave on a native application or browser and from a host device, a key generation request to a secure key client to generate a key pair; perform a multi-party key generation operation between the secure key client on the native application or browser and a secure key server; and store a first private key share and public key on the secure key client, wherein a second private key share and a public key are stored on the secure key server and wherein the public key is sent from the secure key server to a host server for storage.

Clause 3. A non-transitory computer-readable medium having stored thereon instructions that, when executed by one or more processors, cause the one or more processors to be configured to: generate, in a software enclave on a native application or browser and from a host device, a key generation request to a secure key client to generate a key pair; perform a multi-party key generation operation between the secure key client on the native application or browser and a secure key server; and store a first private key share and public key on the secure key client, wherein a second private key share and a public key are stored on the secure key server and wherein the public key is sent from the secure key server to a host server for storage.

Clause 4. An apparatus for performing attestation, the apparatus including one or more: means for generating, in a software enclave on a native application or browser and from a host device, a key generation request to a secure key client to generate a key pair; means for performing a multi-party key generation operation between the secure key client on the native application or browser and a secure key server; and means for storing a first private key share and public key on the secure key client, wherein a second private key share and a public key are stored on the secure key server and wherein the public key is sent from the secure key server to a host server for storage.

Clause 5. A processor-implemented method of assertion, the processor-implemented method comprising: transmitting, from a software enclave on a native application or browser and from a host device, a challenge request to a host server; receiving, at the host device, a challenge from the host server; transmitting the challenge from the host device to a secure key client in the software enclave; transmitting the challenge from the secure key client in the software enclave to a secure key server; performing a multi-party key generation operation between the secure key client on the native application or browser and the secure key server to generate a signed challenge; and transmitting the signed challenge to the host server to verify a signature with a stored public key on the host server.

Clause 6. An apparatus for performing assertion, the apparatus comprising: at least one memory; and at least one processor coupled to at least one memory and configured to: transmit, from a software enclave on a native application or browser and from a host device, a challenge request to a host server; receive, at the host device, a challenge from the host server; transmit the challenge from the host device to a secure key client in the software enclave; transmit the challenge from the secure key client in the software enclave to a secure key server; perform a multi-party key generation operation between the secure key client on the native application or browser and the secure key server to generate a signed challenge; and transmit the signed challenge to the host server to verify a signature with a stored public key on the host server.

Clause 7. A non-transitory computer-readable medium having stored thereon instructions that, when executed by one or more processors, cause the one or more processors to be configured to: transmit, from a software enclave on a native application or browser and from a host device, a challenge request to a host server; receive, at the host device, a challenge from the host server; transmit the challenge from the host device to a secure key client in the software enclave; transmit the challenge from the secure key client in the software enclave to a secure key server; perform a multi-party key generation operation between the secure key client on the native application or browser and the secure key server to generate a signed challenge; and transmit the signed challenge to the host server to verify a signature with a stored public key on the host server.

Clause 8. An apparatus for performing an assertion, the apparatus including one or more: means for transmitting, from a software enclave on a native application or browser and from a host device, a challenge request to a host server; means for receiving, at the host device, a challenge from the host server; means for transmit the challenge from the host device to a secure key client in the software enclave; means for transmitting the challenge from the secure key client in the software enclave to a secure key server; means for performing a multi-party key generation operation between the secure key client on the native application or browser and the secure key server to generate a signed challenge; and means for transmitting the signed challenge to the host server to verify a signature with a stored public key on the host server.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. The various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term “including” should be read as meaning “including, without limitation” or the such as; the term “example” is used to provide exemplary instances of the item in discussion, not an exhaustive or limiting list thereof; the terms “a” or “an” should be read as meaning “at least one,” “one or more” or the such as; and adjectives such as “conventional,” “traditional,” “normal,” “standard,” “known” and terms of similar meaning should not be construed as limiting the item described to a given time period or to an item available as of a given time, but instead should be read to encompass conventional, traditional, normal, or standard technologies that may be available or known now or at any time in the future. Hence, where this document refers to technologies that would be apparent or known to one of ordinary skill in the art, such technologies encompass those apparent or known to the skilled artisan now or at any time in the future.

A group of items linked with the conjunction “and” should not be read as requiring that each and every one of those items be present in the grouping, but rather should be read as “and/or” unless expressly stated otherwise. Similarly, a group of items linked with the conjunction “or” should not be read as requiring mutual exclusivity among that group, but rather should also be read as “and/or” unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as “one or more,” “at least,” “but not limited to” or other such as phrases in some instances shall not be read to mean that the narrower case is intended or required in instances where such broadening phrases may be absent. The use of the term “module” does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

It is to be understood that the above description is intended to be illustrative, and not restrictive. For example, the above-described embodiments (and/or aspects thereof) may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms “including” and “in which” are used as the plain-English equivalents of the respective terms “comprising” and “wherein.” Also, in the following claims, the terms “including” and “comprising” are open-ended, that is, a system, device, article, or process that includes elements in addition to those listed after such a term in a claim are still deemed to fall within the scope of that claim. Moreover, in the following claims, the terms “first,” “second,” and “third,” etc. are used merely as labels, and are not intended to impose numerical requirements on their objects. The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, various features may be grouped together to streamline the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

The invention claimed is:

1. A processor-implemented method of attestation, the processor-implemented method comprising:

- generating, in a software enclave on a native application or browser and from a host device, a key generation request to a secure key client to generate a key pair;
- performing a multi-party key generation operation between the secure key client on the native application or browser and a secure key server;
- storing a first private key share and public key on the secure key client, wherein a second private key share and a public key are stored on the secure key server and wherein the public key is sent from the secure key server to a host server for storage;
- receiving, at the host device, a challenge from the host server;
- transmitting the challenge from the host device to the secure key client in the software enclave;
- transmitting the challenge from the secure key client in the software enclave to the secure key server;
- performing a multi-party key generation operation between the secure key client on the native application or browser and the secure key server to generate a signed challenge; and
- transmitting the signed challenge to the host server to verify a signature with a stored public key on the host server.

2. The method of claim 1, wherein the software enclave utilizes a trusted execution environment (TEE) or a Web Crypto API (WCA) for generating the key pair.

3. The method of claim 1, further comprising using a device-binding key to sign every message throughout the protocol, the device-binding key binding all interactions to the current device.

4. The method of claim 1, wherein the multi-party key generation operation uses threshold cryptography, such as ECDSA or RSA.

5. The method of claim 1, further comprising associating the key shares with a unique identifying set including a DeviceID, UserID, ApplicationID, and EnvironmentID.

6. The method of claim 1, wherein the secure key server transmits the public key to a host server for storage and verification.

7. The method of claim 1, further comprising performing a key refresh procedure to update the MPC Key Share after each use, ensuring the Key Share becomes outdated if an adversary clones the device without gaining persistent access.

8. The method of claim 1, further comprising using the stored public key on the host server to verify signatures generated by the secure key client and secure key server.

9. The method of claim 1, further comprising transmitting a challenge request from the host device to the host server, receiving a challenge, and using multi-party computation to generate a signed challenge for verification with the stored public key.

10. A processor-implemented method of assertion, the processor-implemented method comprising:

- transmitting, from a software enclave on a native application or browser and from a host device, a challenge request to a host server;
- receiving, at the host device, a challenge from the host server;
- transmitting the challenge from the host device to a secure key client in the software enclave;
- transmitting the challenge from the secure key client in the software enclave to a secure key server;
- performing a multi-party key generation operation between the secure key client on the native application or browser and the secure key server to generate a signed challenge;
- transmitting the signed challenge to the host server to verify a signature with a stored public key on the host server.

11. The method of claim 10, wherein the software enclave utilizes a trusted execution environment (TEE) or a Web Crypto API (WCA) for generating the key pair.

12. The method of claim 10, further comprising using a device-binding key to sign every message throughout the protocol, the device-binding key binding all interactions to the current device.

13. The method of claim 10, wherein the multi-party key generation operation uses threshold cryptography, such as ECDSA or RSA.

14. The method of claim 10, further comprising associating the key shares with a unique identifying set including a DeviceID, UserID, ApplicationID, and EnvironmentID.

15. The method of claim 10, wherein the secure key server transmits the public key to a host server for storage and verification.

16. The method of claim 10, further comprising performing a key refresh procedure to update the MPC Key Share after each use, ensuring the Key Share becomes outdated if an adversary clones the device without gaining persistent access.

17. A non-transitory computer-readable medium having stored thereon instructions that, when executed by one or more processors, cause the one or more processors to be configured to:

- transmit, from a software enclave on a native application or browser and from a host device, a challenge request to a host server;
- receive, at the host device, a challenge from the host server;
- transmit the challenge from the host device to a secure key client in the software enclave;
- transmit the challenge from the secure key client in the software enclave to a secure key server;
- perform a multi-party key generation operation between the secure key client on the native application or browser and the secure key server to generate a signed challenge;
- transmit the signed challenge to the host server to verify a signature with a stored public key on the host server.

18. An apparatus for performing an assertion, the apparatus including at least one memory; and at least one processor coupled to at least one memory and configured to:

- transmit, from a software enclave on a native application or browser and from a host device, a challenge request to a host server;
- receive, at the host device, a challenge from the host server;
- transmit the challenge from the host device to a secure key client in the software enclave;
- transmit the challenge from the secure key client in the software enclave to a secure key server;
- perform a multi-party key generation operation between the secure key client on the native application or browser and the secure key server to generate a signed challenge; and
- transmit the signed challenge to the host server to verify a signature with a stored public key on the host server.

19. The apparatus of claim 18, wherein the at least one processor coupled to at least one memory is further configured to check the assertion using internet connectivity rather than cell phone telephony by calling a service without user action to avoid phishing.

* * * * *